United States Patent
Bahret

(10) Patent No.: US 8,807,232 B2
(45) Date of Patent: Aug. 19, 2014

(54) INTEGRATED STUD INSERTION AND REMOVAL APPARATUS

(76) Inventor: John Elliot Bahret, Middletown, RI (US)

(*) Notice: Subject to any disclaimer, the term of this patent is extended or adjusted under 35 U.S.C. 154(b) by 294 days.

(21) Appl. No.: 13/275,396

(22) Filed: Oct. 18, 2011

(65) Prior Publication Data

US 2012/0111582 A1    May 10, 2012

Related U.S. Application Data

(60) Provisional application No. 61/394,033, filed on Oct. 18, 2010.

(51) Int. Cl.
*A01L 11/00* (2006.01)
*A01L 7/00* (2006.01)

(52) U.S. Cl.
CPC .. *A01L 11/00* (2013.01); *A01L 7/00* (2013.01)
USPC ............................................. 168/45; 168/29

(58) Field of Classification Search
USPC .......... 168/45, 44; 81/177.4, 490, 125.1, 437; 7/138, 142
See application file for complete search history.

(56) References Cited

U.S. PATENT DOCUMENTS

| | | | | |
|---|---|---|---|---|
| 1,250,328 A * | 12/1917 | Langford | ........................ | 81/436 |
| 2,196,849 A * | 4/1940 | Beeg | .............................. | 81/439 |
| 2,466,884 A * | 4/1949 | English et al. | ............... | 81/125.1 |
| 4,434,828 A * | 3/1984 | Trincia | ......................... | 81/177.4 |
| 5,016,380 A * | 5/1991 | Jones | ................................ | 42/90 |
| 5,303,439 A * | 4/1994 | Seals | ................................ | 7/138 |
| 5,492,040 A * | 2/1996 | Bellas | ......................... | 81/125.1 |
| 6,009,779 A * | 1/2000 | Mastroni | ......................... | 81/438 |
| 6,016,728 A * | 1/2000 | Bohl | ............................. | 81/437 |
| 6,164,172 A * | 12/2000 | Huang | ............................ | 81/490 |
| 6,739,224 B1 * | 5/2004 | Wershe | ........................ | 81/437 |
| 6,764,301 B2 * | 7/2004 | Paleno et al. | ................. | 431/253 |
| 7,052,128 B1 * | 5/2006 | Kung-Ping | ..................... | 351/42 |
| 7,255,028 B1 * | 8/2007 | Di Bitonto et al. | ............. | 81/439 |
| 8,430,003 B1 * | 4/2013 | Johnson | ......................... | 81/490 |
| 2002/0007705 A1 * | 1/2002 | Beauchamp | .................... | 81/490 |
| 2005/0011011 A1 * | 1/2005 | Oberndorfer | ...................... | 7/138 |
| 2005/0247587 A1 * | 11/2005 | Holland-Letz | ................ | 206/373 |
| 2008/0083304 A1 * | 4/2008 | Finn | .............................. | 81/177.4 |
| 2008/0276765 A1 * | 11/2008 | Johnson et al. | ................. | 81/184 |

* cited by examiner

*Primary Examiner* — Son T Nguyen

(57) ABSTRACT

An integrated horseshoe stud storage, insertion and removal apparatus is provided. The apparatus includes a stud storage cylinder containing a multi-function tool set for cleaning horseshoe stud holes; and removing and inserting horseshoe studs. The multi-function tool set is adapted to secure storage within the stud storage cylinder. In addition, the stud storage cylinder is adapted securely hold a variety of studs readily visible and available.

6 Claims, 4 Drawing Sheets

US 8,807,232 B2

INTEGRATED STUD INSERTION AND REMOVAL APPARATUS

CROSS-REFERENCE TO RELATED APPLICATIONS

The present application is related to, claims the earliest available effective filing date(s) from (e.g., claims earliest available priority dates for other than provisional patent applications; claims benefits under 35 USC §119(e) for provisional patent applications), and incorporates by reference in its entirety all subject matter of the following listed application(s) (the "Related Applications") to the extent such subject matter is not inconsistent herewith; the present application also claims the earliest available effective filing date(s) from, and also incorporates by reference in its entirety all subject matter of any and all parent, grandparent, great-grandparent, etc. applications of the Related Application(s) to the extent such subject matter is not inconsistent herewith.

U.S. provisional patent application 61/394,033, entitled "Integrated Stud Insertion and Removal Apparatus", naming John E. Bahret, as inventor, filed 18 Oct. 2010

BACKGROUND

1. Field of Use

These teachings relate generally to a system for fitting studs to the shoes of hoofed animals, in particular for the fitting and removal of studs in the shoes of horses and ponies.

2. Description of Prior Art (Background)

Horses wear a certain number of studs on each horse shoe for competitions on different surfaces. Generally, the studs must be installed on the grass and removed before the horse leaves the grass area. Currently, the studs must be screwed into a horseshoe with a wrench, and three to four full rotations are required to install or remove the stud. This has to be done while holding a horse's foot in an upright position, a difficult task that must occur in an often hectic environment where the horse is uncomfortable and excited. In addition, several tools are necessary for preparing the holes for stud installation and the most commonly used tool for actually screwing in the studs is an adjustable mechanics wrench. The studs are usually stored loosely in box containers and are not easily accessible while holding the horse's foot off the ground, cleaning the stud holes, selecting the stud and screwing it in while reaching for and using several different tools which are generally stored separately. Accordingly, there is a need in the art for a stud system designed for easy and quick stud insertion and removal.

BRIEF SUMMARY

The foregoing and other problems are overcome, and other advantages are realized, in accordance with the presently preferred embodiments of these teachings.

In accordance with one embodiment of the present invention an integrated stud insertion and removal apparatus is provided. All the tools necessary for installing the studs are pre-sized and contained in one apparatus. The necessary wrenches for stud installation and removal are pre-sized so no adjustable wrenches are required. The apparatus also provides pre-tapped holes for storing various types of studs. For example, several sizes and types of studs may be stored: Road Studs ½" 6 side, Road Studs ⅜" 6 side, Road Studs ⅜" 4 side, Road Studs 4 side, Road Studs 4 side, Road Studs ⅜" 6 side, Road Studs 6-side low profile, Grass Studs ⅜" 4 side, Grass Studs ⅜" 4 side, Grass Studs 9/16" 6 side, Tall Mud Studs ⅜" Round, Deep Footing Studs 4 side, and Deep Footing Studs 6 side.

The invention is also directed towards an integrated horseshoe stud insertion and removal apparatus. The apparatus includes a stud storage apparatus; a first tool; and a second tool. The second tool is adaptable to mate with the first tool are adaptable for storage within the stud storage apparatus. The tools are mated inside the storage apparatus and an arrangement of bevels, or shoulders, on the tools and within the stud storage apparatus securely hold the mated tools within the storage apparatus.

In accordance with another embodiment of the present invention a horseshoe stud storage device is provided. The device includes a hollow cylindrical tube having a plurality of pre-tapped holes disposed on an outer surface of the hollow cylindrical tube; a first beveled shoulder disposed on an interior end of the hollow cylindrical tube; and a second beveled shoulder disposed on an the other interior end of the hollow cylindrical tube. The device also includes a first tool having a beveled shoulder mateable with the beveled shoulder disposed on an interior end of the hollow cylindrical tube. The device also includes a second tool, mateable with the first tool, and having a beveled shoulder mateable with the beveled shoulder disposed on the other interior end of the hollow cylindrical tube.

The invention is also directed towards a horseshoe stud kit having a substantially cylindrical first tool, a substantially cylindrical second tool, and a hollow stud storage cylinder. The first tool includes a pick disposed towards one end of the cylindrical first tool. The first tool also includes a first wrench disposed towards the other end of the cylindrical first tool. The second tool includes a tap disposed towards one end of the cylindrical second tool. The second tool also includes a second wrench disposed towards the other end of the cylindrical second tool. The hollow stud storage cylinder includes a plurality of holes disposed on the outer surface of the hollow stud storage cylinder for storing horseshoe studs. The holes may be tapped, self tapping, or adaptable to receive threaded inserts.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

DETAILED DESCRIPTION

Figure 1:
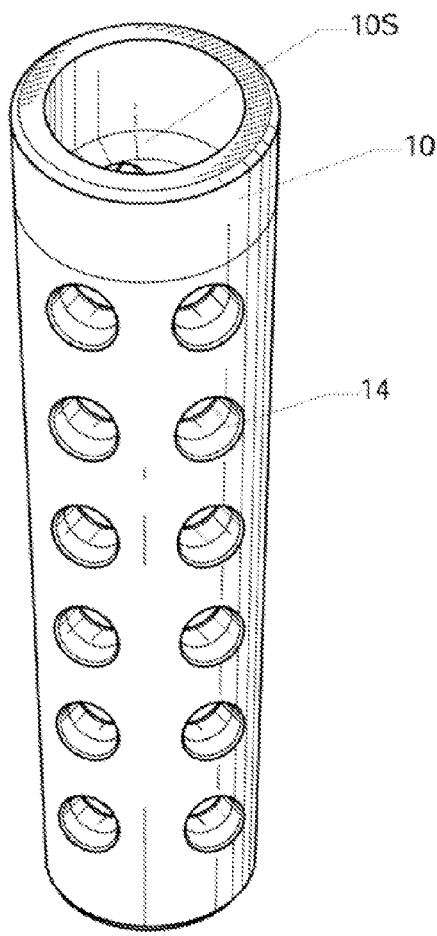
FIG. 1 is an offset vertical pictorial illustration of a stud storage cylinder showing a portion of the beveled interior shoulder in accordance with the invention shown in FIG. 8.

Referring to FIG. 1, there is shown an offset vertical pictorial illustration of a stud storage cylinder 10 showing a portion of a beveled interior shoulder 10S in accordance with one embodiment of the present invention. The stud storage cylinder 10 may be any suitable synthetic material, such as a plastic. In addition the stud storage cylinder 10 may be any suitable outside diameter and any suitable inside diameter sized to accommodate stud holes 14 tapped to hold various stud sizes and shapes (See FIG. 8).

Still referring to FIG. 1, there is shown a portion of the beveled interior shoulder 10S. It will be appreciated that the beveled interior shoulder 10S mates with a beveled tool shoulder (See FIG. 5) to prevent the tool(s) from sliding through the cylinder when tools are stored.

Figure 2:
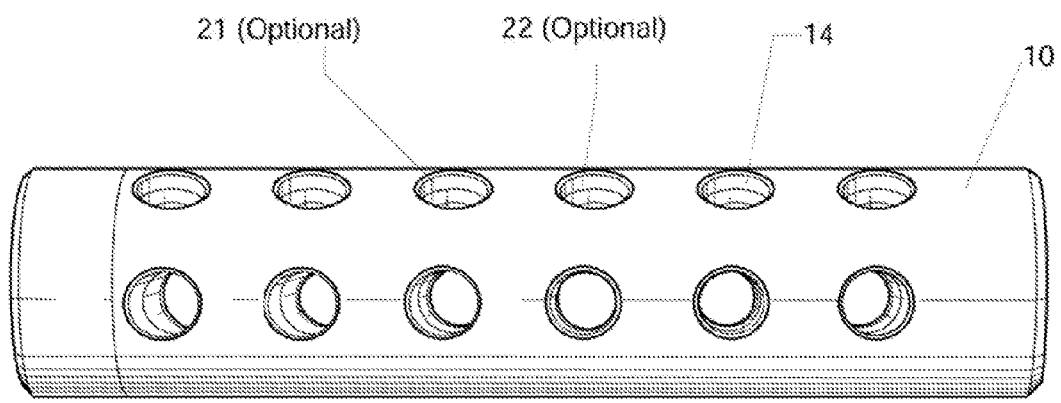
FIG. 2 is horizontal pictorial illustration of the storage cylinder in accordance with the invention shown in FIG. 8.
Figure 8:
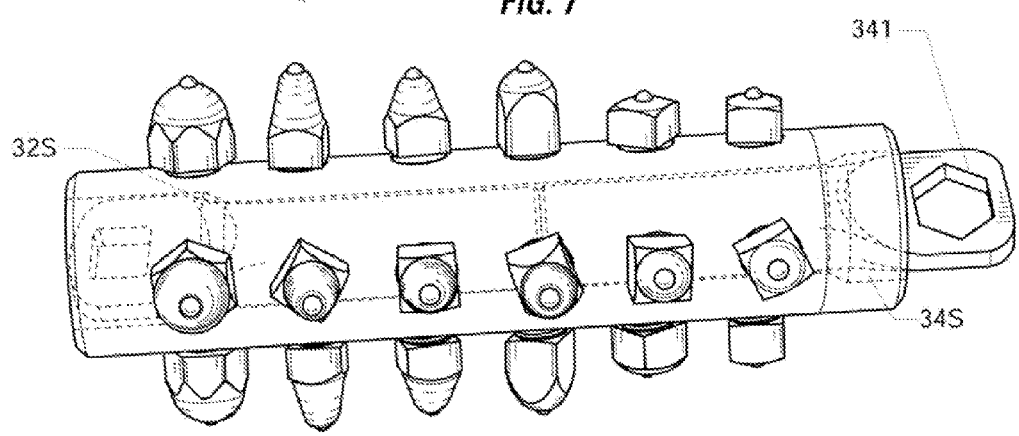
FIG. 8 is a pictorial representation illustrating the beveled interior shoulders of an assembled stud removal and insertion apparatus mating with the beveled tool set shoulders in accordance with the invention.

Referring also to FIG. 2 there is shown a horizontal pictorial illustration of the stud storage cylinder 10 in accordance with the invention shown in FIG. 8. As noted earlier storage cylinder 10 may be any suitable material and thickness sized to accommodate stud holes 14 tapped to hold various stud sizes and shapes (See FIG. 8). In addition, storage cylinder 10 may be any suitable material and thickness sized to accommodate self-tapping 21, or non-self-tapping 22, threaded inserts. It will also be understood that stud holes 14 may be suitably sized to hold studs by exerting a suitable inward pressure, or compression, on stud screw when the screw is inserted into storage cylinder 10.

Figure 3:
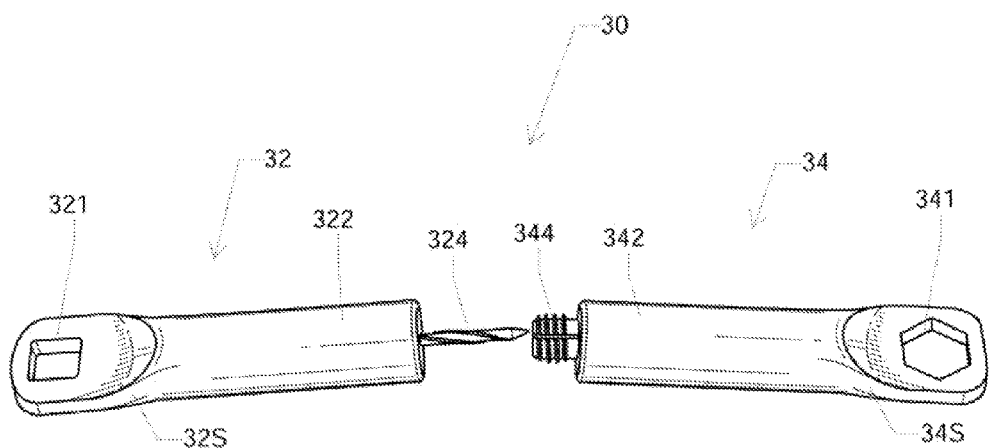
FIG. 3 is a pictorial illustration of the tool set in accordance with the invention shown in FIG. 8.

Referring also to FIG. 3 there is shown a pictorial illustration of the assembled multi-function tool set 30 in accordance with the invention shown in FIG. 8. Tool set 30 includes wrench/pick tool 32 with beveled shoulder 32S and wrench/tap cleaner tool 34 with beveled shoulder 34S. Wrench/pick tool 32 includes pre-sized four-sided spanner or flat wrench fitting 321 and handle 322. It will be appreciated that flat wrench fitting 321 is suitably sized to fit four-sided studs. It will also be appreciated that handle 322 may be knurled for improved gripping. Wrench/pick tool 32 also includes pick 324 for cleaning mud, cotton packing, and other debris or hole plugs from the horseshoe. It will be understood that pick 324 may by any suitable pick including a pick/brush combination wherein the pick is substantially encircled along its length by a brush.

Still referring to FIG. 3, wrench/tap cleaner tool 34 includes hollow cleaning tap 344 for cleaning tapped horseshoe stud holes and receiving pick 324. Wrench/tap cleaner also includes pre-sized six-sided flat wrench fitting 341 and handle 342. It will be appreciated that flat wrench fitting 341 is suitably sized to fit six-sided studs. It will also be appreciated that handle 342 may be knurled for improved gripping.

Figure 4:
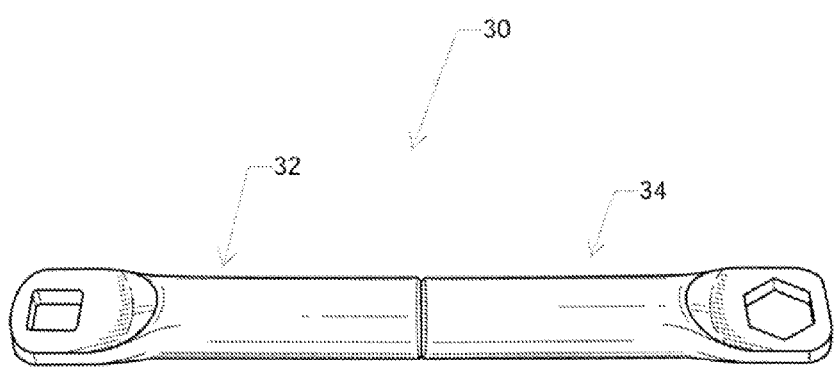
FIG. 4 is a pictorial view of the tool set that illustrates the integrated relationship of the tool set shown in FIG. 3.

It will be understood that wrench/pick tool 32 is pre-tapped to match hollow cleaning tap 342 threads allowing wrench/tap cleaner tool 34 and Wrench/pick tool 32 to be fastened together as shown in FIG. 4

Figure 5:
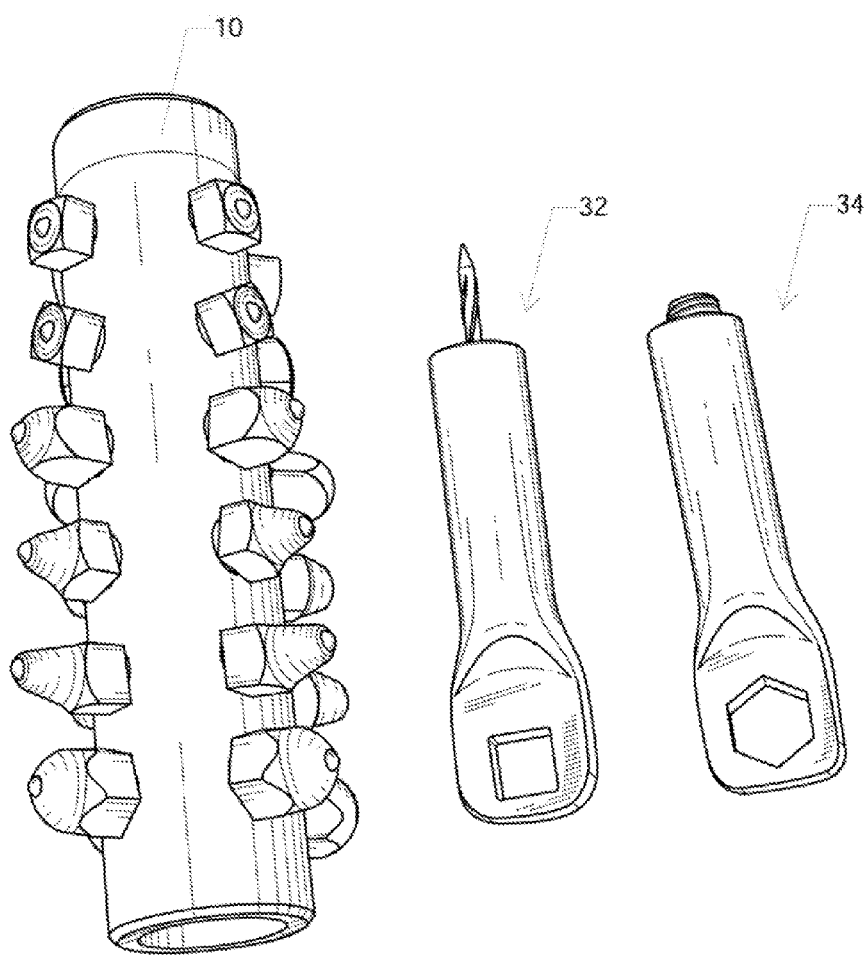
FIG. 5 is a pictorial representation of the disassembled stud removal and insertion apparatus in accordance with the invention shown in FIG. 8.

Referring also to FIG. 5 there is shown a pictorial representation of the disassembled stud removal and insertion apparatus in accordance with the invention shown in FIG. 8. The apparatus includes stud storage cylinder 10, wrench/pick tool 32, and wrench/tap cleaner tool 34. Also shown are various multi-sided sized studs in their stored positions. It will be understood that the arrangement of the studs in their stored position is arbitrary and may be any suitable arrangement.

Figure 6:
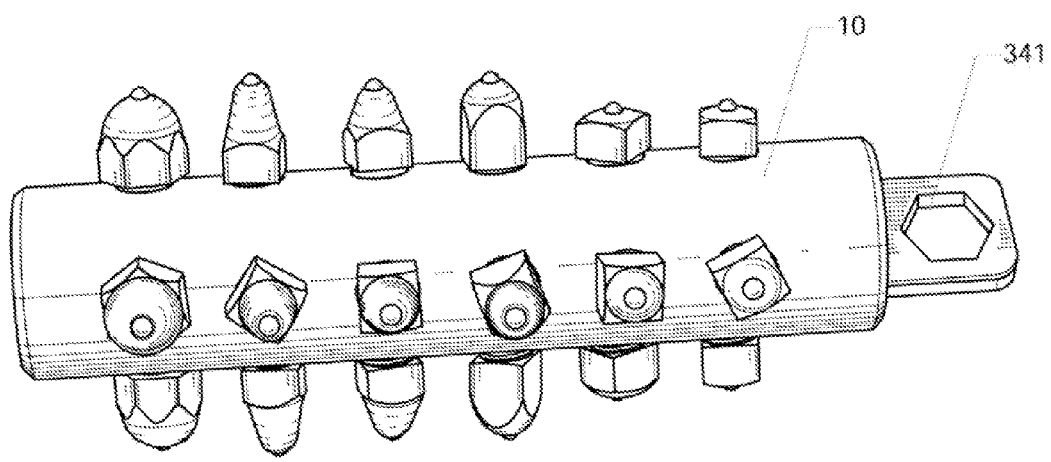
FIG. 6 is a pictorial representation of an exterior view of an assembled stud removal and insertion apparatus in accordance with the invention shown in FIG. 8.
Figure 7:
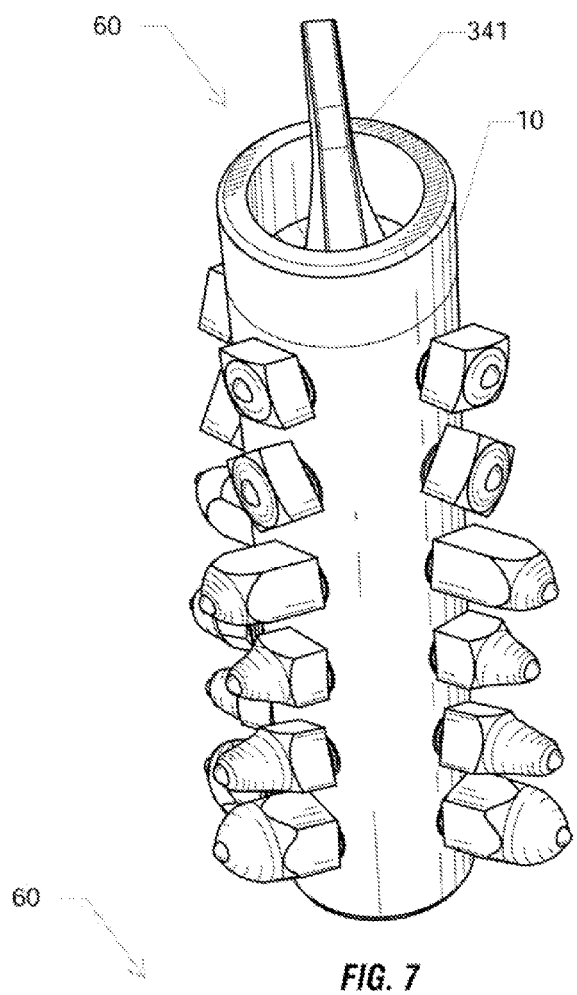
FIG. 7 is a pictorial representation showing a portion of the beveled interior shoulder of an assembled stud removal and insertion apparatus in accordance with the invention shown in FIG. 8.

Referring also to FIG. 6 and FIG. 7 there is shown a pictorial representation of an exterior view of an assembled stud removal and insertion apparatus 60 in accordance with the invention shown in FIG. 8. Assembled stud removal and insertion apparatus 60 includes stud storage cylinder 10, wrench/pick tool 32, and wrench/tap cleaner tool 34. Also shown are various multi-sided sized studs in their stored positions. It will be appreciated that in the assembled position in FIG. 6, wrench/pick tool 32 is not visible from a side view. Also, it will be understood that the wrench fitting 341 protrudes from the stud storage cylinder 10 to provide an attachment connection for carrying the assembled stud removal and insertion apparatus 60 by, for example, key chains, belt clips, and C-clips.

Still referring to FIG. 6, it will be understood that the storage positions of wrench/pick tool 32, and wrench/tap cleaner tool 34 may be reversed such that the wrench fitting 321 protrudes from the stud storage cylinder 10 to provide an attachment connection for carrying the assembled stud removal and insertion apparatus 60.

Referring also to FIG. 8 there is shown a pictorial representation illustrating the beveled interior stud storage cylinder shoulders 10S, 10S1 of an assembled stud removal and insertion apparatus mating with the beveled tool set shoulders 32S, 34S in accordance with the invention. It will be understood that wrench/pick tool 32, and wrench/tap cleaner tool 34 are inserted into the ends of the stud storage cylinder 10 and assembled or fastened together inside the stud storage cylinder 10. It will be appreciated that the beveled shoulders 10S and 10S1 prevent the assembled tool set 30 from sliding through the stud storage cylinder 10.

It should be understood that the foregoing description is only illustrative of the invention. Thus, various alternatives and modifications can be devised by those skilled in the art without departing from the invention.

What is claimed is:

1. An integrated horseshoe stud insertion and removal apparatus comprising:
    a stud storage apparatus comprising a stud storage cylinder, wherein the stud storage cylinder comprises: a hollow cylinder comprising two distal ends and a center, wherein a first end of the hollow cylinder comprises: a first predetermined outer diameter surface; a first predetermined inner diameter surface; a second predetermined inner diameter surface; a first beveled surface adjacent to the first predetermined inner diameter surface and the second predetermined inner diameter surface, wherein the first beveled surface is distally located a first distance from the cylinder center; wherein the second distal end of the hollow cylinder comprises: the first predetermined outer diameter surface; a third predetermined inner diameter surface; a fourth predetermined inner diameter surface; a second beveled surface adjacent to the third predetermined inner diameter surface and the fourth predetermined inner diameter surface, wherein the second beveled surface is distally located a second distance from the cylinder center; and at least one plurality of tapped holes for receiving and storing studs;
    a first tool comprising a substantially cylindrically shaped tube, wherein the substantially cylindrically shaped tube comprises: a four-sided flat wrench disposed on one end of the substantially cylindrically shaped tube, wherein the a four sided flat wrench comprises a fifth outer diameter; a recessed pick disposed and centered on an end opposite to the four sided flat wrench, wherein the pick end of the substantially cylindrically shaped tube comprises a sixth outer diameter, and wherein the pick end of the substantially cylindrical shaped tube comprises a threaded hole for receiving the second tool when in the storage position; and a third beveled surface adjacent to the fifth outer diameter and the sixth outer diameter, wherein third beveled surface is adapted to mate with the first beveled surface when in the storage position;

a second tool, wherein the second tool is adaptable to mate with the first tool and wherein the mated first tool and the second tool are adaptable for storage within the stud storage apparatus the second tool comprising a second substantially cylindrically shaped tube, wherein tile second substantially cylindrically shaped tube comprises: a six-sided flat wrench disposed on one end of the substantially cylindrically shaped tube, wherein the a six sided flat wrench comprises a seventh outer diameter; a hollow tap disposed and centered on an end opposite to the six sided flat wrench, wherein the hollow tap end of the substantially cylindrically shaped tube comprises an eighth outer diameter; a fourth beveled surface adjacent to the seventh outer diameter and the eighth outer diameter, wherein fourth beveled surface is adapted to mate with the second beveled surface when in the storage position; and wherein the hollow tap is adapted to receive the pick when the first tool and the second tool are stored in the apparatus.

2. The apparatus as in claim 1 wherein the stud storage apparatus comprises a plurality of pre-tapped holes for storing the horseshoe studs.

3. The apparatus as in claim 1 wherein the stud storage apparatus comprises a plurality of compression holes for storing the horseshoe studs.

4. A horseshoe stud storage device, comprising:
a hollow cylindrical tube comprising:
a plurality of pre-tapped holes disposed on an outer surface of the hollow cylindrical tube;
a first beveled shoulder disposed on an interior end of the hollow cylindrical tube;
a second beveled shoulder disposed on an the other interior end of the hollow cylindrical tube,
a first tool comprising a substantially cylindrically shaped tube, wherein the substantially cylindrically shaped tube comprises: a four sided flat wrench disposed on one end of the substantially cylindrically shaped tube; and a third beveled shoulder adapted to mate with the first beveled shoulder when the first tool is in the storage position; a recessed pick disposed and centered on an end opposite to the four sided flat wrench, wherein the end opposite to the four-sided flat wrench comprises a threaded hole for receiving the second tool when in the storage position within the hollow cylindrical tube;
a second tool, wherein the second tool is mateable to the first tool to provide secure storage for the first tool and the second tool within the hollow cylindrical tube; the second tool comprising a second substantially cylindrically shaped tube, wherein the substantially cylindrically shaped tube comprises: a six sided flat wrench disposed on one end of the second substantially cylindrically shaped tube; and a fourth beveled shoulder adapted to mate with tile second beveled shoulder when the second tool is in the storage position within the hollow cylindrical tube; a threaded tap disposed and centered on an end opposite to the six sided flat wrench, wherein the threaded tap end of the second substantially cylindrically shaped tube comprises a hole for receiving the recessed pick when in the storage position within the hollow cylindrical tube.

5. The device as in claim 4 wherein the hollow cylindrical tube further comprises a plurality of compression holes disposed on the outer surface of the hollow cylindrical tube for storing the horseshoe studs.

6. The device as in claim 4 wherein the hollow cylindrical tube further comprises a plurality of holes disposed on the outer surface of the hollow cylindrical tube for receiving threaded inserts.

* * * * *